Nov. 28, 1961 T. S. REESE 3,010,861
MANUFACTURE OF TRANSFER-DECORATED EXTRUSION PRODUCTS
Filed April 19, 1957
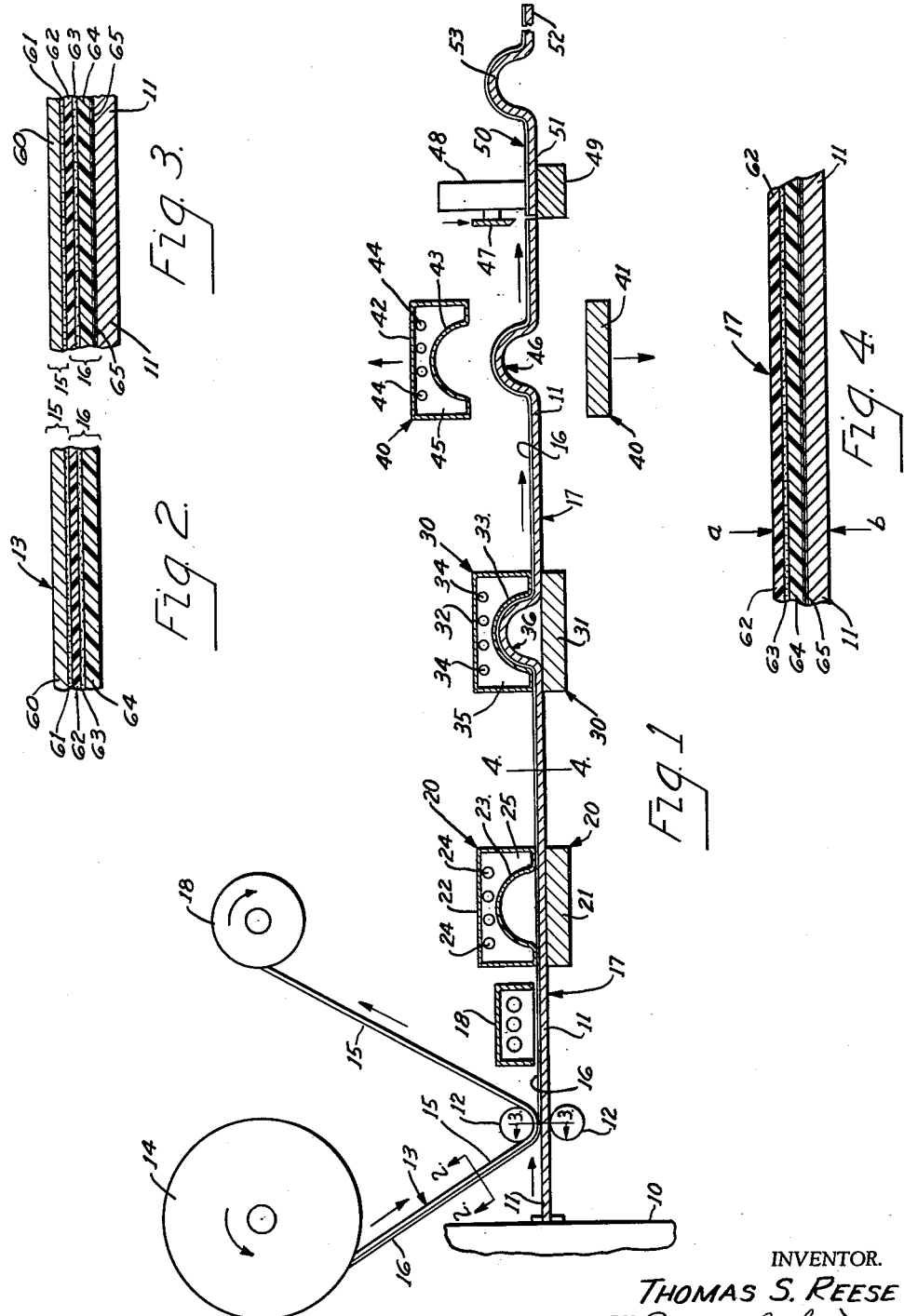
INVENTOR.
THOMAS S. REESE
BY
ATTORNEYS.

3,010,861
MANUFACTURE OF TRANSFER-DECORATED EXTRUSION PRODUCTS

Thomas S. Reese, University Heights, Ohio, assignor to De-Noc Chemical Arts, Inc., Cleveland, Ohio, a corporation of Ohio
Filed Apr. 19, 1957, Ser. No. 653,838
3 Claims. (Cl. 156—199)

This invention relates to the manufacture of transfer-decorated extrusion products.

Transfer decorated products are well known, but heretofore it has not ordinarily been practicable to post-form them. When, in the past, attempts have been made to form transfer decorated products after the transfer has been applied to the base material, and particularly under conditions requiring substantial displacement of portions of the products with respect to other portions as in the well-known vacuum-forming operation, defects such as cracking, wrinkling, blistering and the like have tended to develop in the decorated surface. The difficulties appear to have resided in part in the nature of the transfer applied to the product and in part in the nature of the bond between the transfer and the base material. For example, in some cases, even though undecorated plastic products may be post-formed without difficulty, the same product, subject to the same forming step after decoration with the transfer, has been impossible to form satisfactorily without destroying or at least seriously damaging the appearance of the transfer decoration.

One of the objects of the present invention is to eliminate the disadvantages and defects of the kinds referred to above by providing a novel method of manufacture employing a transfer especially adapted to be mounted on a plastic product that is to be subjected to a post-forming operation. Another object is the provision of a transfer decorated plastic product and a method of making the transfer decorated product which all together result in a superior product which can be produced at reasonable cost and at high rates of production.

Other objects are the provision of a transfer that is particularly adapted to be bonded to a plastic sheet immediately after the sheet is extruded; the provision of a method of bonding a transfer to such a sheet; the provision of a thermoplastic transfer which, if desired, may incorporate a thermosetting resin that sets up under the conditions under which the transfer is bonded to the plastic sheet; and, with particular reference to a transfer of the latter type, the provision of a method of applying the transfer to a plastic sheet involving forming the plastic sheet in such manner that the forming operation is completed before the thermosetting material in the transfer has set.

Other objects, advantages and features of the invention will become apparent from the following description of a preferred form thereof, reference being made to the accompanying drawings. The essential characteristics are summarized in the claims.

In the drawings:

FIGURE 1 is a schematic representation of a system for applying the transfer to the base, stripping the carrier from the transfer, and vacuum-forming the transfer decorated product;

FIGURE 2 is a section, diagrammatic in nature and much enlarged, through the transfer before its application to the base;

FIGURE 3 is a similar section on line 3—3 of FIGURE 1 immediately following application of the transfer to the base; and FIGURE 4 is a similar section after the carrier has been stripped from the transfer decorated product.

Referring to FIGURE 1, extruder 10 serves as the source of a continuously extruded sheet 11. Preferably, the latter is a thermoplastic synthetic resin of a kind that can be melted and extruded at moderate temperatures; e.g., temperatures below about 400° F. Although there are many such, a typical and preferred synthetic resin suitable for these purposes is a modified polystyrene, reference being had not only to styrene polymers but to polymers of methyl styrene, mixtures of the two polymers, and mixtures of either with other thermoplastic synthetic resins. Representative of the latter are the various vinyl polymers and copolymers, polymers derived from the methyl esters of methacrylic acids, polymers derived from the ethyl esters of methacrylic acid, copolymers of the two, the polyacrylonitriles, and the like.

Assuming sheet 11 to be commercial polystyrene at a temperature of 400° F. (at which temperature it is not completely reacted but continues to give off an appreciable amount of monomeric styrene in the form of vapor), it proceeds from the extruder to a pair of opposed pinch rolls 12, where under the localized pressure applied by the pinch rolls it is combined with a transfer indicated in general at 13 that is continuously unwound from supply roll 14 in sheet form. Transfer 13 preferably is of the dry stripping type; that is to say, it comprises a backing sheet 15 of paper, fabric or the like that has been so treated, as by coating it with a stripping layer, that it can be separated from the transfer film 16 at moderate temperatures; e.g., temperatures up to 275° F., merely by pulling the two apart. Although the use of a softening medium is not excluded, it is not usually necessary if a transfer of the dry-stripping type is used.

In FIGURE 1, for convenience in illustration, the backing sheet 15 is represented as a single layer and the transfer film 16 is likewise represented as consisting of a single layer. In practice, each is made up of a plurality of laminae, as will appear. In passing through pinch rolls 12, the transfer film 16 is bonded to polystyrene sheet 11. The elevated temperature of the sheet 11, the above-described release of unreacted styrene vapors which tend to soften the face of the transfer in contact with the sheet 11, and the pressure exerted by the pinch rolls all cooperate to bond the transfer film 16 permanently to the sheet 11. The backing sheet 15 is continuously stripped from the composite at the zone of the pinch rolls; the stripped backing sheet proceeds from pinch rolls 12 to a takeup roll 18, where it is wound for reuse. The sheet 11, with the transfer film 16 bonded thereto, proceeds on through the apparatus, as shown, the composite sheet being indicated at 17 in the drawing.

At this time the composite is ready for post-forming. The polystyrene sheet 11 is maintained in workable condition, either from residual heat carried over from extruder 10 or by heat supplied by electric heaters 18. The transfer film 16 is permanently bonded to the sheet 11 with a fusion zone between them as described hereinafter. As will appear, one side of polystyrene sheet 11 (the lower side where the apparatus is of the type illustrated in FIGURE 1) constitutes one of the two exposed faces of the final product. The other face of the final product is supplied by transfer film 16.

The post-forming apparatus is illustrated in diagrammatic fashion in FIGURE 1 of the drawing. Although other forms of post-forming apparatus may be used, a suitable apparatus, shown at 20, comprises a vacuum-forming unit that has just been brought into proximity to composite 17. The unit consists of an underlying platen-like element 21 and an overlying vacuum box 22 embodying a female mold 23. These may be reversed, if desired, in order to take advantage of the action of gravity. Mold 23 and electric heating elements 24 are disposed in the chamber 25 within vacuum box 22.

Vacuum-forming unit 20 travels with composite 17 in the direction indicated by the arrows. Both are conveyed from left to right as seen in FIGURE 1 by endless chains (not shown). These chains, to which composite 17 is fastened at its lateral edges, keep composite 17 from necking down; i.e. narrowing under the influence of heat. The post-forming step is carried out by creating a vacuum within the box 22 as the unit travels along.

A similar vacuum-forming unit in which a vacuum has already been developed and applied to composite 17 is indicated at 30. It comprises a lower platen-like element 31 and an opposing vacuum box 32 having a female mold 33 and heating elements 34 suitably located within chamber 35. In the drawing, composite 17 is shown as having been pulled upward by the vacuum in chamber 35 to produce the bowed portion 36, where it engages the lower face of mold 33. Unit 30, like unit 20, travels along with composite 17 from left to right through the apparatus as the forming operation is being carried out.

Another similar vacuum-forming unit 40, which has already reached the limit of its travel, is shown to the right of unit 30. Unit 40 consists of a platen-like element 41 and a vacuum box 42, the latter having a mold 43 and heating elements 44 in vacuum chamber 45. At this stage, the element 41 and box 42 are separated to release the composite. By the time composite 17 has reached this stage, it has hardened sufficiently so that it is no longer workable. It therefore retains the shape imparted to it by the mold.

As it continues in its travel from left to right, the composite passes a shear 47, 48 that severs it on anvil 49 between the drawn or formed portions thereof into units 50. In ordinary circumstances, the shear 47, 48 cuts the composite approximately half-way between two successive bowed portions, as a result of which product 50 has flat portions 51 and 52 that are offset relative to bowed portion 53. It will be noted that there is a substantial difference in elevation between them; i.e., the composite has been subjected to a rather deep drawing operation.

Although the product at this stage is no longer workable, it is still warm from heat carried over from extruder 10 augmented by heat supplied by the resistance heating elements 18, 24, 34 or 44, as the case may have been. It is, however, sufficiently rigid so that it can be handled without likelihood of serious distortion. In the main, subsequent steps comprise trimming the edges of the product to remove unwanted flash, particularly along those edges not severed by shear 47, 48. The product may then be packed, stored, shipped or put to use, as, for example, as a three-dimensional sign, a plaque or a blister package. The product is usually free of defects such as cracks, wrinkles, bubbles, etc., this notwithstanding the fact that it incorporates what was originally the relative fragile transfer film 16.

Referring now to FIGURE 2; i.e., the complete transfer 13, it will be noted that there are five distinct laminae. The backing sheet 15 is made up of a support 60 with a stripping layer 61 thereon. The support 60 preferably is paper of the kind made by casting paper stock against a highly polished chromium-plated metal drum of the kind described in Bradner Patent 1,719,166. Finishing the paper stock on a chromium-plated drum of this kind imparts to the paper a particularly smooth, glossy finish. The paper is not calendered in the usual sense of the term, the smoothness of the finished surface of the paper being imparted by the chromium-plated drum against which the stock is cast. Not being subjected to extreme compression, the body of the paper is not densified.

Paper of the kind described is available in various thicknesses in weights varying from 30 lbs. to 70 lbs. It is sold by Champion Paper and Fibre Company, Hamilton, Ohio under the registered trademark "Krome-Kote." The grade ("Ctd Litho") preferred for use in the invention has a nominal weight of 70 lbs., a breaking strength of 16 to 18 lbs. per square inch, a thickness of about 0.0043", and an elongation of about 0.0093" to 0.0095" as measured by a Mullin tester. It has a clay coating which tends to enhance the smoothness of the surface. It need not be sized; if sized, the casein, rosin or other material that is used as the size is introduced into the paper stock before the latter is cast against the drum. The finished surface, although glossy, is neither hard nor impervious; on the contrary, it tends to be absorptive notwithstanding the fact that its gloss reading is exceptionally high.

Stripping layer 61 is applied to the finished face of paper sheet 60. Preferably, it consists of polyethylene. It is formed by coating the paper at 200° F. with a solution of polyethylene in a volatile organic solvent such as xylol, high flash naptha, or a mixture of the two. The following is an example of a suitable solution:

| | Parts by weight |
|---|---|
| Polyethylene | 40 |
| High flash naphtha | 40 |
| Xylol | 20 |
| Total | 100 |

Preferably, the polyethylene has a molecular weight in the range between about 12,000 and 21,000. The solution contains about 30% solids, although it may vary from as little as 5% to as much as 50%. It is applied by spraying, spreading, brushing, roll coating or an equivalent operation. The coating is dried in any convenient manner to provide the stripping layer 61. The thickness of the stripping layer preferably is of the order of 0.0005".

In lieu of polyethylene it is possible to use vinyl chloride polymers or copolymers, vinylidene chloride polymers or copolymers or other materials that will adhere firmly to the paper and provide a smooth surface from which the transfer film 16 can be separated.

The stripping layer so applied to the glossy face of the paper may be hardened in any convenient way, as, for example, by running the coated product through a drying tunnel through which a current of heated air is being passed. This step serves to drive off the solvent. The dry material, although very thin and located on the glossy face of the paper, adheres tenaciously enough to the paper so that delamination at moderate temperatures is virtually an impossibility.

The exposed surface of lamina 61 is the surface on which the transfer film 16 is formed and from which it is later separated. Separation or stripping must occur between lamina 61 and the transfer film, specifically lamina 62 of the transfer film, rather than between lamina 61 and the paper. There must, however, be enough adherence between lamina 61 and lamina 62 to permit the transfer as a whole to be handled as a unit.

Such adherence can be provided by formulating lamina 62 of suitable material such as, for example, the following composition:

| | Parts by weight |
|---|---|
| ½° cellulose acetate butyrate | 100.00 |
| Polymeric epoxy plasticizer | 60.00 |
| Butyl acetate | 148.00 |
| Butyl alcohol | 60.00 |
| Toluol | 152.00 |
| Xylol | 120.00 |
| Phenyl salicylate | 1.50 |
| Total | 641.50 |
| Solids _____ percent | 25 |

In the above formulation, the plasticizer may be Admex 710, a product of Archer-Daniels-Midland Company described as a polymeric-type epoxidized soya bean oil plasticizer of medium oil length.

Compositions containing polyvinyl acetals may likewise be employed, as indicated by the following formulation based on the use of polyvinyl formal:

| | Parts by weight |
|---|---|
| Polyvinyl formal | 15.00 |
| Butyl alcohol | 5.00 |
| Ethyl alcohol (denatured) | 25.00 |
| Toluol | 55.00 |
| Dibutyl phthalate | 2.50 |
| Total | 102.50 |

The polyvinyl formal should be one of low viscosity and low hydroxyl content; i.e., the hydroxyl content (as polyvinyl alcohol) should be from 5% to 7%.

A formulation in which polyvinyl butyral is used for these purposes is the following:

| | Parts by weight |
|---|---|
| Polyvinyl butyral | 4.00 |
| Ethyl alcohol (denatured) | 22.00 |
| Butyl alcohol | 7.00 |
| Toluol | 15.00 |
| Total | 48.00 |

The polyvinyl butyral should be of the high viscosity type; i.e., 140 to 200 centipoises (7½% solution in methanol at 20° C.).

Another suitable composition is the following:

| | Parts by weight |
|---|---|
| Polyvinyl butyral | 10.00 |
| Butylated melamine-formaldehyde resin | 2.00 |
| ½° nitrocellulose (SS type) | 2.00 |
| Butyl acetate | 3.00 |
| Butyl alcohol | 15.00 |
| Toluol | 10.00 |
| Total | 42.00 |

Still another such composition is as follows:

| | Parts by weight |
|---|---|
| Polyvinyl butyral | 34.00 |
| Butylated melamine-formaldehyde resin | 6.00 |
| ½° nitrocellulose (SS type) | 6.00 |
| Butyl acetate | 10.00 |
| Butyl alcohol | 65.00 |
| Ethyl alcohol | 180.00 |
| Toluol | 120.00 |
| Total | 421.00 |

The composition from which lamina 62 is formed almost always contains large amounts of volatile solvents which must be eliminated. This is best done at elevated temperatures, particularly if solvent recovery is contemplated. To that end, a process of hardening may be employed similar to that described above in the case of the composition used to form lamina 61. If so, the incompletely processed material may be passed in continuous fashion through a drying oven heated to a moderate temperature by a current of hot air. After elimination of solvents, the thickness of lamina 62 is preferably between about 0.00075" and 0.0025"; a thickness of about 0.001" is particularly satisfactory.

Once the transfer film (lamina 62) has hardened, it becomes possible to imprint on it so as to form a decorative layer 63. The latter may or may not take the form of a continuous lamina, for by "imprinting" reference is had to the production of a continuous or discontinuous design, by means of a plate or roller, with or without the use of ink. If ink is used, the ink must of course be compatible with the materials of which lamina 62 is formed.

Such an ink may consist of the following:

| | Parts by weight |
|---|---|
| Carbon black | 10.00 |
| Precipitated calcium carbonate | 4.00 |
| Acryloid Resin B-73 | 32.00 |
| Acryloid Resin A-101 | 8.00 |
| Methyl ethyl ketone | 12.00 |
| Toluol | 48.00 |
| Xylol | 30.00 |
| Total | 144.00 |
| Solids percent | 37½ |

The resins referred to above are polymerized esters of acrylic acid and alpha methyl acrylic acid, methyl and ethyl esters being present. They are products of The Rohm & Haas Company.

The following is another example of a suitable ink:

| | Parts by weight |
|---|---|
| Titanium dioxide | 18.00 |
| Precipitated calcium carbonate | 3.00 |
| Ketone resin | 5.00 |
| Polyvinyl butyral | 10.00 |
| Dioctyl phthalate | 3.50 |
| Butyl alcohol | 20.50 |
| Ethyl alcohol | 20.00 |
| Toluol | 20.00 |
| Total | 100.00 |
| Solids percent | 39.5 |

The resin that is referred to above as "Ketone resin" is that supplied by Krumbhaar Chemicals, Inc., South Kearny, N.J., as Resin #1717.

Obviously, various other pigmenting materials can be used in either formulation.

After decorative layer 63 has been formed, and, if necessary, given time to dry, a resinous bonding layer, lamina 64, is laid down on it. The exposed face of this lamina constitutes the exposed face of transfer 13 as first made up and is the face of the transfer that is bonded to polystyrene sheet 11. Preferably bonding layer 64 consists largely of a polyacrylate resin such as Acryloid B73 (Rohm and Haas) dissolved in toluol and xylol, the solids content of the liquid ranging from 25% to 40%. This resin consists of esters of acrylic acid and alpha methyl acrylic acid, the methyl and ethyl esters being present as copolymers. Bonding layer 64 is preferably laid down in such manner that it has a wet thickness of about .020" and a dry thickness of from .005" to .007".

An example of a composition suitable for use in forming lamina 64 is the following, which composition may be pigmented if desired:

| | Parts by Weight |
|---|---|
| Acryloid Resin B-73 | 30.00 |
| Acryloid Resin A-101 | 8.00 |
| Methyl ethyl ketone | 12.00 |
| Toluol | 60.00 |
| Xylol | 40.00 |
| Total | 150.00 |
| Solids percent | 25 |

Lamina 64 as so formulated acts as a bonding medium to secure the transfer to polystyrene sheet 11. The union is accomplished as the transfer 13 and sheet 11 pass between the rolls 12. The bonding of layer 64 and sheet 11 is facilitated by the free monomeric styrene that is present when the hot polystyrene leaves the extruder. The styrene is an excellent solvent for the acrylic resin and brings about an immediate and satisfactory bond between the sheet 11 and transfer film 16 so that the backing sheet 15, consisting of paper 60 and lamina 61, can be separated from the rest of the transfer, preferably immediately after leaving pinch rolls 12. Transfer film 16 consists of the transfer layer (lamina 62), the decorative layer 63, and the surface layer (lamina 64): see FIGURE 2. What has been referred to as composite 17 is shown to better advantage in FIGURE 4, from which will be seen where and how plastic sheet 11 is united to lamina 64. The two are united in a zone of fusion shown at 65: see FIGURE 3.

With further reference to transfer film 16; i.e., that which remains after paper 60 and stripping layer 61 have been stripped from transfer 13, it will be noted that decorative layer 63 constitutes an intermediate layer between the transfer layer (lamina 62) and the resinous bonding layer (lamina 64). If formed by the use of ink, decorative layer 63 may be so designed that the transfer is of either the face-up or the face-down type, as desired. If, for example, decorative layer 62 includes a legend, slogan or a trademark consisting of one or more words, it may be so applied to lamina 62 that it will read correctly when viewed from above as indicated by the arrow *a* in FIGURE 4, this being an example of the face-up type of transfer.

On the other hand, decorative layer 63 may, if desired, be so applied that it will read correctly when viewed from the direction of arrow *b* in FIGURE 4, this being an example of the transfer of the face-down type. The former is suitable where the product shown in FIGURE 4 is to be mounted on a wall, a mirror or similar object; the latter, where it is to be mounted on the inside of a window for viewing from the outside; in the latter, the plastic sheet 11 should be transparent. In the invention as illustrated in FIGURE 1, what is involved is the use to transfer of the face-up type, the object being to mount the concave side of the product on a wall, mirror or similar surface.

With further reference to the transfer layer (lamina 62) it should be noted that if the transfer film 16 consists entirely of thermoplastic materials, the product may be allowed to cool and then may be softened by heat at a later time and further worked. Sometimes this is desirable, but at other times it is preferred to incorporate a thermosetting resin in the material from which the transfer film is made. The fourth formulation given above for the transfer layer 62 includes a butylated melamine-formaldehyde resin along with polyvinyl butyral and nitrocellulose. When a transfer containing such a transfer layer is bonded under heat and pressure to an underlying sheet as described above, the melamine-formaldehyde resin cross links with the polyvinyl butyral; the reaction apparently is catalyzed by breakdown products derived from the nitrocellulose under the influence of heat.

With this film, the product, once having been allowed to set, cannot be softened and reworked by the further application of heat. The time required for the reaction, however, is ample to permit the forming operation to be carried out as the material progresses through an apparatus such as described herein. The reaction or setting of the transfer layer 62, when so formulated, provides the finished product with a hard, scratch-resistant surface which is highly advantageous for many products such as refrigerator door linings and other panels used in household appliances.

Thus the invention provides advantageous transfer-decorated plastic products, a novel process for making the same, and transfers particularly adapted for use in such process. In respect of all of them, departures from what has been specifically disclosed herein are possible. A wide variety of changes in the formulations may readily be made by those skilled in the art to which the invention pertains. Other types of paper may be used in place of the cast-coated paper that is used in the preferred embodiment of the invention. In the apparatus, other types of post-forming units may take the place of the vacuum-forming units illustrated in the drawings, such, for example, as male-and-female dies.

It is intended that the patent shall cover, by summarization in appended claims, all features of patentable novelty residing in the invention.

What is claimed is:

1. The method of making a decorated plastic product which includes the steps of extruding a polystyrene sheet at an elevated temperature under conditions such that free monomeric styrene is present in the sheet as it leaves the extrusion orifice; bringing a decorated transfer film into contact with the polystyrene sheet while the sheet is still at an elevated temperature and while free monomeric styrene is still present in the sheet, the transfer film having on its adjacent face a bonding layer consisting essentially of a polyacrylate resin that is soluble in monomeric styrene; and utilizing the solvent action of the monomeric styrene on the polyacrylate resin of the bonding layer to promote permanent bonding of the transfer film to the styrene sheet.

2. The method of making a decorated plastic product which comprises the steps of extruding a polystyrene sheet at an elevated temperature under conditions such that free monomeric styrene is present in the sheet as it leaves the extrusion orifice; bringing a decorated transfer film into contact with the polystyrene sheet while the sheet is still at an elevated temperature and while free monomeric styrene is still present in it, such transfer film having on its adjacent face a bonding layer consisting essentially of a polyacrylate resin that is soluble in monomeric styrene; utilizing the solvent action of the monomeric styrene on the polyacrylate resin of the bonding layer to promote bonding of the transfer film to the extruded sheet; and subjecting the product to a post-forming operation.

3. The method of making a decorated plastic product which comprises the steps of extruding a polystyrene sheet at an elevated temperature under conditions such that free monomeric styrene is present in the sheet as it leaves the extrusion orifice; bringing a decorated transfer film into contact with the polystyrene sheet while the sheet is still at an elevated temperature and while free monomeric styrene is still present in it, such transfer film having on its adjacent face a bonding layer consisting essentially of a polyacrylate resin that is soluble in monomeric styrene; utilizing the solvent action of the monomeric styrene on the polyacrylate resin of the bonding layer to promote bonding of the transfer film to the extruded sheet; and, before the product has cooled, subjecting the product to a vacuum-forming operation.

References Cited in the file of this patent

UNITED STATES PATENTS

| | | |
|---|---|---|
| 2,392,594 | Karfiol | June 8, 1946 |
| 2,404,073 | Karfiol | July 16, 1946 |
| 2,477,300 | Karfiol et al. | July 26, 1949 |
| 2,487,061 | Ptasnik | Nov. 8, 1949 |
| 2,532,941 | Rado | Dec. 5, 1950 |
| 2,545,832 | Wagers et al. | Mar. 29, 1951 |
| 2,556,078 | Francis | June 5, 1951 |
| 2,643,475 | Klopfenstein | June 30, 1953 |
| 2,660,757 | Smith et al. | Dec. 1, 1953 |
| 2,783,172 | Avery | Feb. 26, 1957 |
| 2,811,475 | Edge | Oct. 29, 1957 |
| 2,816,851 | Arledter | Dec. 17, 1957 |

UNITED STATES PATENT OFFICE
CERTIFICATION OF CORRECTION

Patent No. 3,010,861                              November 28, 1961

Thomas S. Reese

It is hereby certified that error appears in the above numbered patent requiring correction and that the said Letters Patent should read as corrected below.

In the grant, lines 2 and 12, and in the heading to the printed specification, line 5, name of assignee, for "De-Noc Chemical Arts, Inc.", each occurrence, read -- Di-Noc Chemical Arts, Inc. --; column 7, line 32, for "to", first occurrence, read -- of --.

Signed and sealed this 17th day of April 1962.

(SEAL)
Attest:

ESTON G. JOHNSON                            DAVID L. LADD
Attesting Officer                             Commissioner of Patents